United States Patent
Ye et al.

(10) Patent No.: US 12,430,001 B2
(45) Date of Patent: Sep. 30, 2025

(54) EMOJI PREVIEW METHOD AND APPARATUS, DEVICE AND MEDIUM

(71) Applicant: Beijing Zitiao Network Technology Co., Ltd., Beijing (CN)

(72) Inventors: Jiawen Ye, Beijing (CN); Lei Gong, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 96 days.

(21) Appl. No.: 18/352,790

(22) Filed: Jul. 14, 2023

(65) Prior Publication Data
US 2024/0019985 A1 Jan. 18, 2024

(30) Foreign Application Priority Data
Jul. 14, 2022 (CN) .................... 202210834094.7

(51) Int. Cl.
G06F 3/04817 (2022.01)
G06F 3/0483 (2013.01)
G06F 3/04842 (2022.01)
H04L 51/04 (2022.01)

(52) U.S. Cl.
CPC ........ *G06F 3/04817* (2013.01); *G06F 3/0483* (2013.01); *G06F 3/04842* (2013.01); *H04L 51/04* (2013.01)

(58) Field of Classification Search
CPC ............... G06F 3/04817; G06F 3/0483; G06F 3/04842; G06F 3/04845; H04L 51/04
See application file for complete search history.

(56) References Cited

U.S. PATENT DOCUMENTS

| | | | |
|---|---|---|---|
| 2007/0073833 A1 | 3/2007 | Roy et al. | |
| 2018/0335927 A1* | 11/2018 | Anzures | G06V 40/176 |
| 2020/0143447 A1* | 5/2020 | Wang | G06Q 30/0212 |
| 2021/0383588 A1* | 12/2021 | Lee | H04L 65/4015 |

FOREIGN PATENT DOCUMENTS

| | | |
|---|---|---|
| CN | 103942071 A | 7/2014 |
| CN | 104917666 A | 9/2015 |
| CN | 109412929 A | 3/2019 |
| CN | 110070593 A | 7/2019 |
| CN | 112817670 A | 5/2021 |
| CN | 113157157 A | 7/2021 |
| CN | 113535315 A | 10/2021 |
| CN | 115268712 A | 11/2022 |

OTHER PUBLICATIONS

China National Intellectual Property Administration, Office Action and Search Report Issued in Application No. 202210834094.7, Oct. 21, 2023, 28 pages.

* cited by examiner

*Primary Examiner* — Cao H Nguyen
(74) *Attorney, Agent, or Firm* — Alleman Hall & Tuttle LLP (57) ABSTRACT

An emoji preview method and apparatus, a device and a medium are disclosed according to the present disclosure. The method includes: when a first user uploads an emoji through a first page, acquiring an emoji to be added in response to an adding operation triggered by the first user on the first page; after the emoji to be added is acquired, displaying a preview, where the preview corresponds to the emoji to be added.

18 Claims, 6 Drawing Sheets

EMOJI PREVIEW METHOD AND APPARATUS, DEVICE AND MEDIUM

CROSS-REFERENCE TO RELATED APPLICATIONS

This application claims priority to Chinese Patent Application No. 202210834094.7, titled "EMOJI PREVIEW METHOD AND APPARATUS, DEVICE AND MEDIUM", filed on Jul. 14, 2022, which is hereby incorporated by reference in its entirety.

FIELD

The present disclosure relates to the technical field of computers, and in particular to an emoji preview method and apparatus, a device and a medium.

BACKGROUND

In order to enrich user experience, in some applications, a user may interact by sending the emoji. However, in the related technical, the emoji interaction mode is single, which affects user experience.

SUMMARY

In view of the above, an emoji preview method and apparatus, a device and a medium are provided according to embodiments of the present disclosure.

To achieve the above objective, the following technical solutions are provided according to the present disclosure.

In a first aspect of the present disclosure, an emoji preview method is provided. The method includes:
  acquiring an emoji to be added, in response to an adding operation triggered by a first user on a first page; and
  displaying a preview, where the preview corresponds to the emoji to be added.

In a second aspect of the present disclosure, an emoji preview apparatus is provided. The apparatus includes: an acquisition unit and a display unit.

The acquisition unit is configured to acquire an emoji to be added, in response to an adding operation triggered by a first user on a first page.

The display unit is configured to display a preview, where the preview corresponds to the emoji to be added.

In a third aspect of the present disclosure, an electronic device is provided. The electronic device includes a process and a memory, where the memory is configured to store instructions or computer programs; and the processor is configured to execute the instructions or the computer programs in the memory, to cause the electronic device to execute the method according to the first aspect.

In a fourth aspect of the present disclosure, a computer readable storage medium storing instructions is provided, where the instructions, when executed by a device, cause the device to execute the method according to the first aspect.

In a fifth aspect of the present disclosure, a computer program product is provided. The computer program product includes computer programs/instructions. The computer programs/instructions, when executed by a processor, achieve the method according to the first aspect.

BRIEF DESCRIPTION OF THE DRAWINGS

In order to more clearly illustrate technical solutions according to embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from these drawings without any creative work.

DETAILED DESCRIPTION OF EMBODIMENTS

In order to understand the solutions according to the present disclosure better by those skilled in the art, the technical solutions according to embodiments of the present disclosure are clearly and completely described below in conjunction with the drawings of the embodiments of the present disclosure. Apparently, the described embodiments are only some embodiments of the present disclosure, rather than all the embodiments. All the other embodiments obtained by those skilled in the art based on the embodiments in the present disclosure without any creative work fall into the protection scope of the present disclosure.

In some application scenarios, an anchor may make and upload the emoji, such that a user on a viewing side may use the emoji in communication. At present, when the anchor side uploads an emoji, the emoji displayed on the upload page are relatively large to facilitate operation or editing of the anchor, which is convenient for the anchor to check the details. However, the anchor side doesn't know the display effect and use effect of the emoji on the user side, which affects the adjustment of emoji on the anchor side.

Based on the above, an emoji preview method is provided according to the present disclosure. When the user triggers an adding operation on a first page, an emoji to be added is acquired and a preview is displayed. The preview corresponds to the emoji. The first user may timely know the effect of the emoji to be added, on the user side through the preview. Therefore, the first user can adjust the uploaded emoji, such that the uploaded emoji can be fully used by the user on the user side, and user experience may be improved.

It can be understood that, the user is informed of a type, an application range and an application scenario of personal information in an appropriate manner, to obtain permission from the user before the technical solution according to the embodiments of the present disclosure is used.

For example, prompt information is sent to the user in response to a reception of an active request from the user, to explicitly inform the user that the requested operation may acquire and use personal information of the user. Therefore, the user may voluntarily choose whether to provide the personal information to software or hardware, such as an electronic device, an application, a server, or a storage medium, with which an operation is performed according to the technical solutions of the present disclosure. As an optional but non-restrictive implementation, the prompt information is sent to the user with a pop-up window, in response to the reception of the active request from the user. The prompt information may be presented as a text in the pop-up window. In addition, a selection control may be carried in the pop-up window, by which the user may select "agree" or "disagree" to provide personal information to the electronic device.

It can be understood that the above processes of informing the user and acquiring permission from the user is only illustrative, and the implementation of the present disclosure is not limited thereto. Other implementations that conform to the relevant laws and regulations may also be applied to the present disclosure.

For the ease of understanding the technical solutions, the detailed description will be provided below in conjunction with the accompanying drawings.

Figure 1:
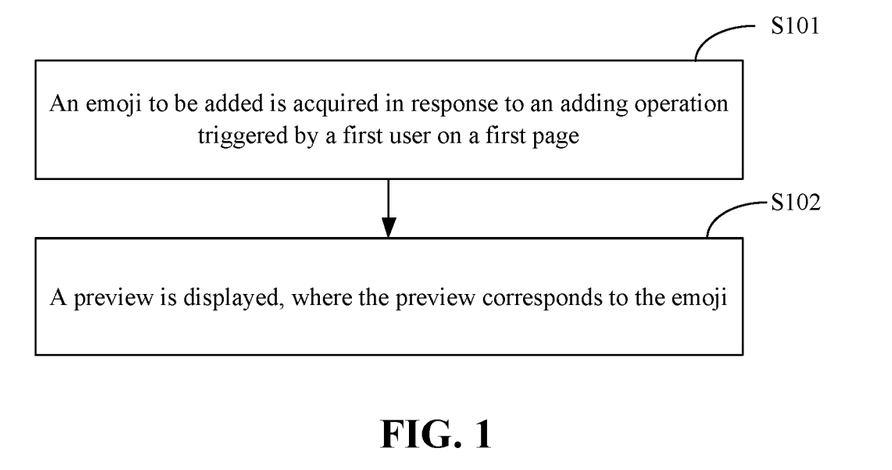
FIG. 1 is a flowchart of an emoji preview method according to an embodiment of the present disclosure.

Referring to FIG. 1, FIG. 1 shows an emoji preview method according to an embodiment of the present disclosure. The method may be executed by an emoji preview client, which may be installed in an electronic device. The electronic device may include some devices such as a mobile phone, a tablet computer, a notebook computer, a desktop computer, an in-vehicle terminal, a wearable electronic device. As shown in FIG. 1, the method may include step S101 and step S102.

In step S101, an emoji to be added is acquired in response to an adding operation triggered by a first user on a first page.

In this embodiment, when the first user wants to upload an emoji, the emoji to be added is acquired in response to the adding operation triggered by the first user on the first page. The first user may be an anchor in a live room, and the first page may be an emoji upload page in the live room. The emoji to be added may be an emoji added by the anchor for audiences in the live room to interact.

Specifically, the client may detect the adding operation triggered by the first user on the first page in real time. In response to the adding operation triggered by the first user, a picture selection page may be displayed; and the first user may select an emoji to be uploaded, on the picture selection page. An emoji selected by the first user is acquired in response to the selection operation performed by the first user. The first user may add multiple emojis at a time. Generally, in order to facilitate users to process the uploaded emoji, the number of emojis uploaded at a time is limited. For example, up to 10 emojis may be uploaded at a time.

Figure 2A:
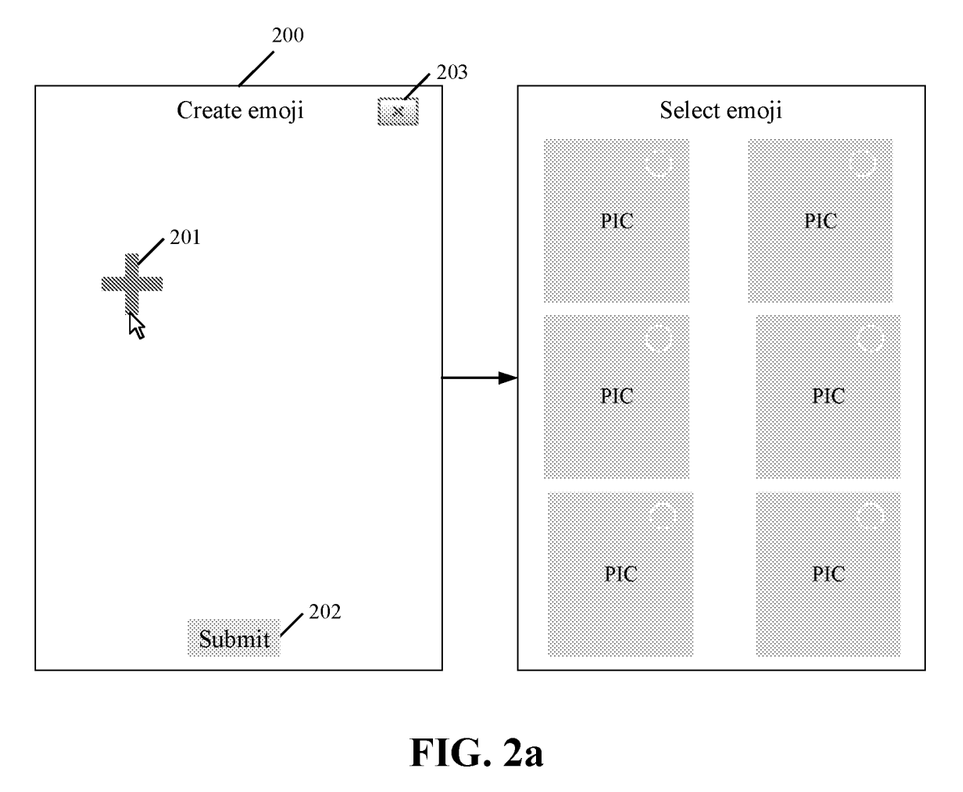
FIG. 2a is a schematic diagram of a selection of an emoji according to an embodiment of the present disclosure.

For example, in a schematic diagram of adding an emoji shown in FIG. 2a, the first page includes an addition control 201, a submission control 202 and a close control 203. When the first user clicks the addition control 201, an album corresponding to the first user is displayed, such that the first user may select the desired picture from the album.

When the first user adds an emoji on the first page, if the emoji to be added is not square, the emoji to be added may be automatically cropped to a square with a center of the emoji as a central anchor point for uploading. Alternatively, if a size of the uploaded emoji does not meet a preset size, the emoji to be added may be automatically cropped and compressed.

In step S102, a preview is displayed, where the preview corresponds to the emoji.

After the emoji to be added by the first user is acquired, a preview corresponding to the emoji is displayed, such that the first user may timely know the actual display effect of the emoji to be added. The emoji may be associated with the live room of the first user, which may be used by the first user or a second user with a preset association relationship with the live room corresponding to the first user. For example, the second user is a user following or subscribing the live room corresponding to the first user. In addition, the second user may be an audience in the live room corresponding to the first user.

Thus, when the first user uploads an emoji by the first page, the emoji to be added is acquired in response to the adding operation triggered by the first user on the first page. After the emoji to be added is acquired, the emoji to be added is displayed in a preview area of the first page, where the preview area is used to display a preview corresponding to the emoji used or browsed by the second user side. That is, when the first user uploads an emoji, the display effect of the emoji being used or browsed by the second user may be displayed to the first user in real time, such that the first user may adjust the uploaded emoji at any time, thereby improving the user experience.

In one embodiment of the present disclosure, a preview control may be displayed. For example, the preview control is displayed on the first page. The preview is displayed in response to a trigger instruction for the preview control. In another embodiment of the present disclosure, the preview is directly displayed in response to the completion of the addition. The completion of the addition may mean that the first user selects a to-be-uploaded emoji on the picture selection page, or the first user selects and submits the to-be-uploaded emoji on the picture selection page by triggering a submission control on the first page, for example.

In an embodiment of the present disclosure, a preview area is displayed on the first page, where the preview area is used to display the preview. The preview area may be located below an area where the emoji to be added is located. In another embodiment of the present disclosure, it is also possible to jump to the third page and display the preview on the third page, such as the preview page.

In an embodiment, when the first user adds more emojis, the preview area is adjusted to ensure that all the emojis to be added may be displayed in the preview area. Specifically, in response to the change in the number of the emojis to be added, the preview area is adjusted to display the previews corresponding to the emojis to be added in the adjusted preview area. In this way, the preview effect is improved by dynamically adjusting the preview area. Alternatively, a switch control is displayed in the preview area. In response to a trigger operation on the switch control, the preview displayed in the preview area is switched. That is, by adjusting the size of the preview area, all the emojis may be displayed in the preview area, such that the first user can view the preview effect of all the emojis to be added. Therefore, it is convenient for the user to perform preview switch, thereby acquiring an interested emoji.

The preview may include a first preview corresponding to an emoji in a message sent by the second user, and/or a second preview corresponding to the emoji being displayed on the second page. The second page is provided with an access to acquire a right to use the emoji, and the second user may acquire the right to use the added emojis. That is, the preview area may display the display effect image corresponding to the case that the second user sends the message including the emoji, or the effect image corresponding to a case that the second user browses the emoji on the second page after the first user publishes the emoji. In this way, the first user can timely know the display effect of the uploaded emoji on the second user side by the preview area. It is possible to help the first user to adjust the emoji timely, such that the uploaded emoji can attract more second users.

Figure 2B:
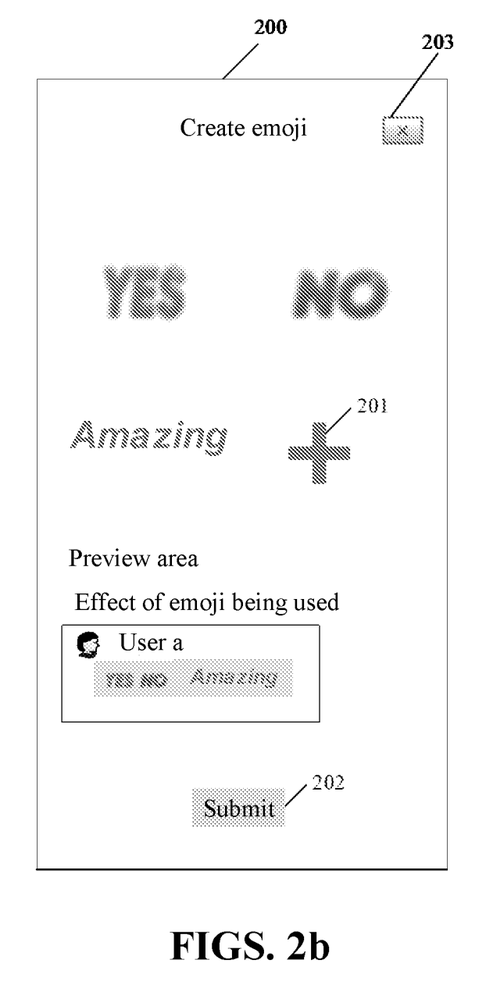
FIG. 2b is a schematic diagram of a first preview according to an embodiment of the present disclosure.

For example, as shown in FIG. 2b, the first user adds three emojis on the first page, namely "YES", "NO" and "AMAZING", and the first preview is a display effect image when the second user (user a) sends a message including the emoji. A display order of emojis in the first preview may be an order of addition in the first page, or be other orders, which is not limited in this embodiment. Specifically, the first preview may be a preview when the second user sends a message including the emoji on the public screen of the live room. The first user may know the display effect of the second user using the emoji in the live room by using the first preview.

In an embodiment of the present disclosure, the first preview includes an identifier of the second user, an emoji sent by the second user, and a comment box, such that the first user may intuitively know scenes in actual application. In addition, size information on the emoji displayed in the first preview is consistent with that on the emoji displayed on the public screen, such that a more real display effect is displayed for the first user, such as the display effect shown in FIG. 2b. It is convenient for the first user to timely adjust attributes such as size of the emoji.

The second preview may be a preview corresponding to a subscription page of the emoji, where the preview may include related elements in the subscription page, such as subscription prompt identification, subscription emoji control. Subscription means that the second user acquires the right to use the emoji uploaded by the first user.

Figure 2C:
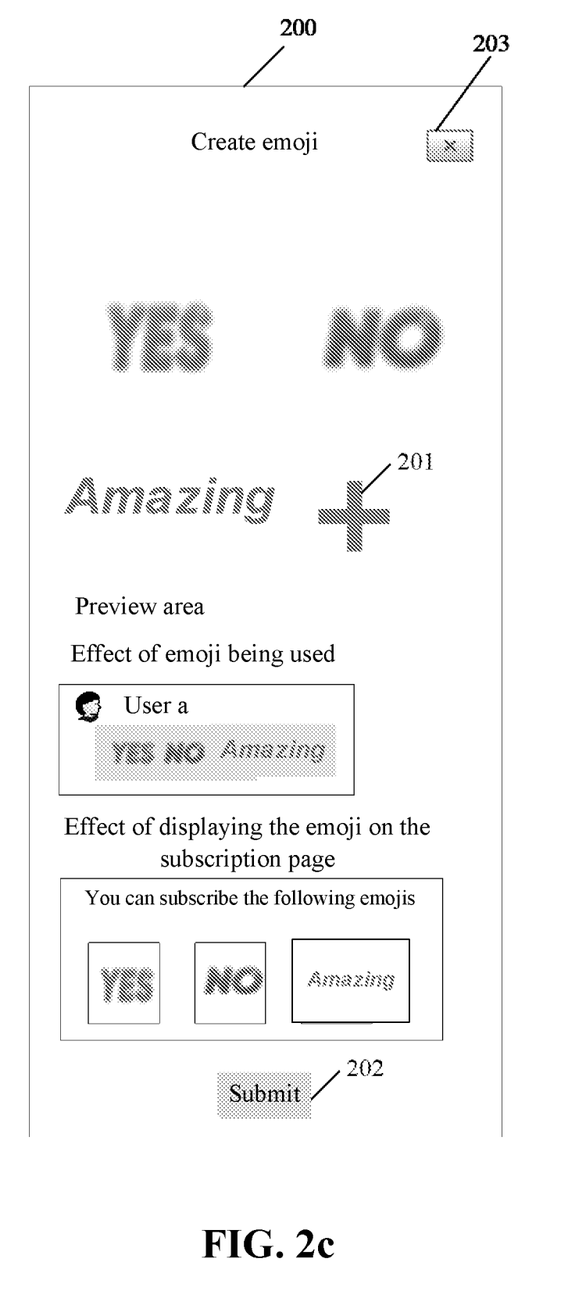
FIG. 2c is a schematic diagram of a second preview according to an embodiment of the present disclosure.

The second page may be a subscription page of the emoji, where the subscription page is provided with an access to acquire a right to use the emoji, by which the second user may acquire the right to use the emoji. Specifically, an acquisition access is provided on the subscription page. In response to a trigger operation for the acquisition access by the second user, a resource transfer page is displayed, where the resource transfer page displays resource information corresponding to the right to use the emoji. The resource information is information on virtual resource. After the second user performs the resource transfer operation corresponding to the resource information, the right to use the emoji is provided to the second user. For example, as shown in FIG. 2c, the emojis corresponding to "YES", "NO" and "AMAZING" uploaded by the first user are displayed on the subscription page.

When the first preview is displayed in the preview area, a preview rule may be determined based on the number of emojis added by the first user, and the first preview may be determined based on the preview rule. That is, the first preview is determined based on the number of the emojis to be added, thereby facilitating the first user to browse the preview.

In an embodiment of the present disclosure, if the number of emojis to be added is less than a first number, a second number of default emojis are acquired; previews when the second user uses the emoji to be added and when a third user uses the second number of default emojis are displayed in the preview area. That is, the first preview is displayed using two users on the user side, and the emoji to be added and the default emoji are displayed separately to facilitate the browsing of the first user. The first number and the second number may be set according to actual applications. For example, the first user may update up to 10 emojis. When the preview is displayed by two users, five emojis are used for each user. Thus, the first number is equal to 5, which indicates that up to 5 emojis are displayed by one user. In order to maintain a neat display effect, the second number may also be equal to 5.

Figure 2D:
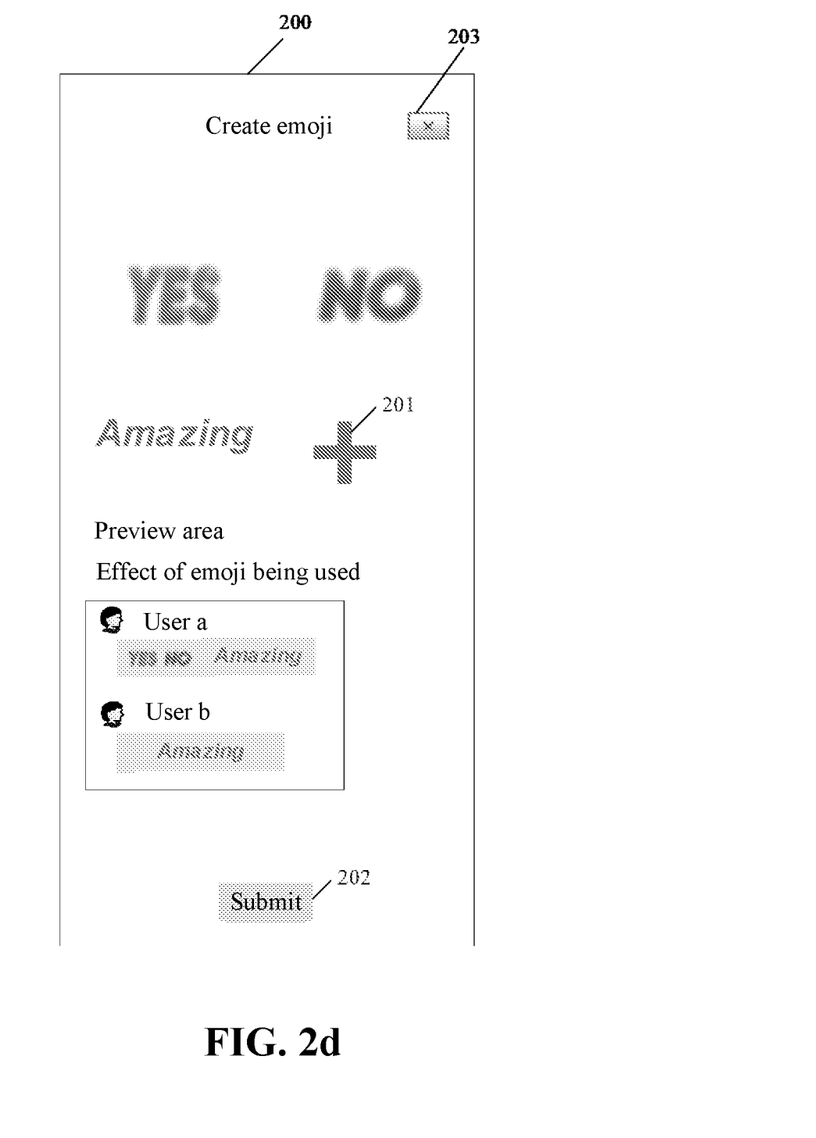
FIG. 2d is a schematic diagram of another first preview according to an embodiment of the present disclosure.

For example, as shown in FIG. 2d, the first number and the second number are both equal to 5. If the first user uploads three emojis, five default emojis are acquired from a default emoji library. The use effect for user a using three emojis and user b using five default emojis is displayed in the first preview.

When the number of emojis to be added is less than the first number, for the second preview, only the emoji added by the first user may be displayed, or the emoji added by the first user and the second number of default emojis may be displayed.

In an embodiment of the present disclosure, if the number of emojis to be added is greater than a first number and less than or equal to a third number, the emoji are divided to acquire a first emoji set and a second emoji set. The previews when the second user uses the first emoji set and the third user uses the second emoji set are displayed in the preview area. The first emoji set includes a fourth number of emoji, and the second emoji set includes emoji of the emojis to be added except the first emoji set. The third number is the maximum number of uploaded emojis, and the fourth number may be equal to the first number. The values of the third number and the fourth number may be determined according to actual applications. In the process of dividing the first emoji set and the second emoji set, the first fourth number of emojis to be added may be determined as the first emoji set based on the addition order, and the remaining emojis are determined as the second emoji set. In addition, the division may also be performed based on other dividing conditions, for example, based on the emoji theme. The emojis belonging to the same theme are determined as a set, such that the first user may view the preview effect belonging to the same theme. That is, according to this embodiment, the uploaded emojis are divided, such that the disorder display effect caused by more uploaded emojis is avoided, which is convenient for the first user to view.

For example, 10 emojis are uploaded by the first user. Based on the addition order, the first 5 emojis of the 10 emojis are determined as a first emoji set and the last 5 emojis are determined as the second emoji set. Therefore, the use effect for user a using the first 5 emojis and user b using the last 5 emojis is displayed in the first preview.

When the number of emojis to be added is greater than the first number and less than or equal to the third number, all the emojis to be added are displayed in the second preview.

In an embodiment of the present disclosure, before the adding operation is triggered by the first user on the first page, the first preview includes a preview corresponding to the second user sending a message with the default emoji, and the second preview is a preview corresponding to the default emoji on the second page, thereby facilitating the first user to preview the default emoji.

In an embodiment of the present disclosure, the method further includes: in response to an editing operation on the emoji triggered by the first user, acquiring an edited emoji; and updating the preview based on the edited emoji. That is, the first user may edit the emoji to be added on the first page. After the editing is performed, the displayed preview is also changed, so as to realize the real-time update and ensure that the first user can view the latest preview effect.

Specifically, after the first user selects an emoji on the first page, an edit icon is displayed in the emoji. In response to the trigger operation on the edit icon, the edit page is entered. On the edit page, the user may rotate the emoji, select a position by drawing a rectangle, and add a text in the selected position.

In an embodiment of the present disclosure, in response to a submission request for the emoji to be added, the emoji is determined as an emoji for the live room of the first user, such that the second user performs comment and interaction in the live room by using this emoji. That is, the emoji is determined as the emoji for the live room of the first user, thereby increasing the diversity of interaction and improving the user experience. For example, when the first user triggers the submission control 202 shown in FIG. 2b, to submit the emoji. After the submission is passed, the second user may perform comment by using the emoji added by the first user in the live room of the first user, thereby realizing the exclusivity of the emoji.

Figure 3:
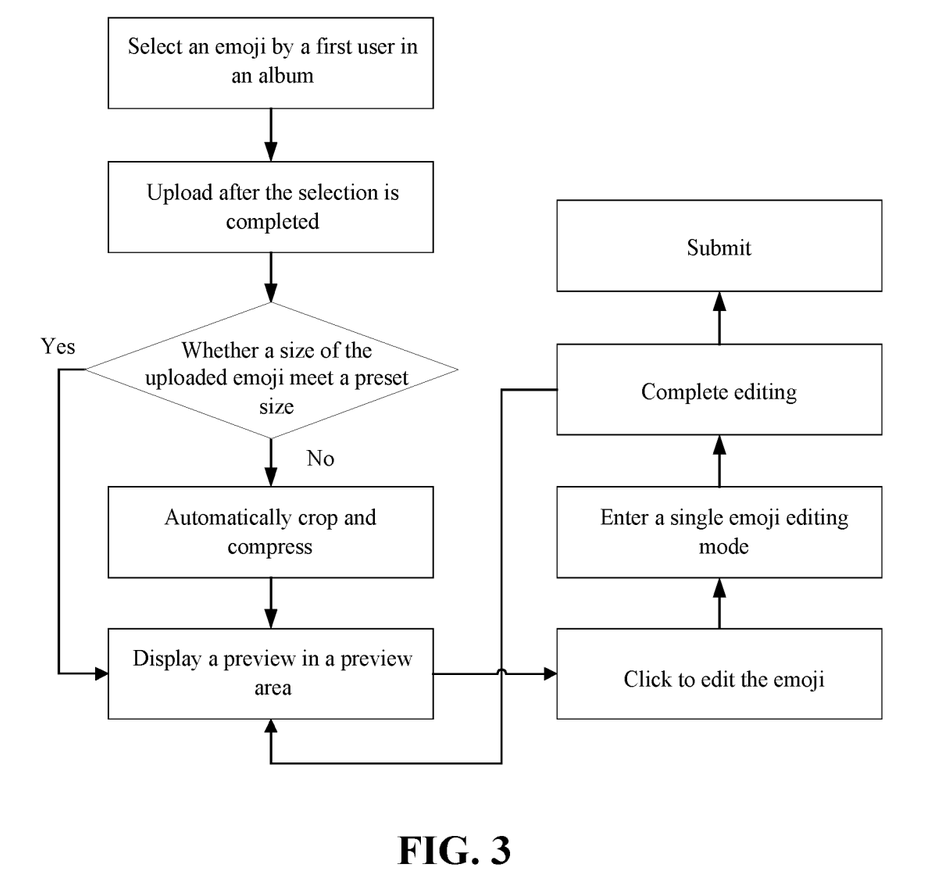
FIG. 3 is a block diagram of an emoji preview according to an embodiment of the present disclosure.

For example, in a block diagram of an emoji preview shown in FIG. 3, the first user selects an emoji to be added from an album, and uploads the selected emoji. A client may automatically detect whether a size of the uploaded emoji meets a preset size. If the size of the uploaded emoji does not meet the preset size, the emoji is automatically cropped and compressed, to acquire an emoji that meets the preset condition and display a preview corresponding to the emoji in the preview area. If the size of the uploaded emoji meets the preset size, a preview corresponding to the emoji is directly displayed in the preview area. If the user triggers the editing of the emoji, a single emoji editing mode is entered, in which the first user may edit a single emoji. After editing is performed, the preview in the preview area is updated based on the edited emoji.

Based on the embodiments of the method described above, an emoji preview apparatus and device are provided according to embodiments of the present disclosure. The apparatus and the device will be described below in conjunction with the accompanying drawings.

Figure 4:
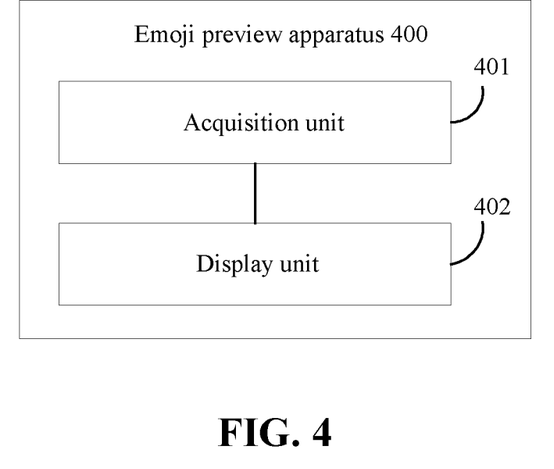
FIG. 4 is a structural diagram showing an emoji preview apparatus according to an embodiment of the present disclosure.

Referring to FIG. 4, FIG. 4 is a structural diagram showing an emoji preview apparatus according to an embodiment of the present disclosure. As shown in FIG. 4, the emoji preview apparatus 400 includes an acquisition unit 401 and an display unit 402.

The acquisition unit 401 is configured to acquire an emoji to be added, in response to an adding operation triggered by a first user on a first page.

The display unit 402 is configured to display a preview, where the preview corresponds to the emoji.

In an embodiment of the present disclosure, the display unit 402 is specifically configured to display the preview in a preview area of the first page.

In an embodiment of the present disclosure, the emoji is associated with a live room of the first user; and is used by the first user, or a second user with a preset association relationship with the live room corresponding to the first user.

In an embodiment of the present disclosure, the preview includes a first preview corresponding to the emoji in a message sent by the second user, and/or a second preview corresponding to the emoji being displayed on a second page, where the second page is provided with an access to acquire a right to use the emoji, and the second user acquires the right to use the emoji through the access.

In an embodiment of the present disclosure, the first preview is a preview corresponding to the emoji in the message published by the second user on a public screen of the live room.

In an embodiment of the present disclosure, the first preview includes an identifier of the second user, an emoji sent by the second user and a comment box.

In an embodiment of the present disclosure, size information on the emoji displayed in the first preview is consistent with size information on the emoji displayed on the public screen.

In an embodiment of the present disclosure, the apparatus further includes a determination unit.

The determination unit is configured to determine the emoji as an emoji for the live room of the first user, in response to a submission request for the emoji to be added, wherein the second user performs comment and interaction by using the emoji in the live room.

In an embodiment of the present disclosure, the apparatus further includes a determination unit.

The determination unit is configured to: determine a preview rule based on the number of emoji to be added; and determine the first preview based on the preview rule.

In an embodiment of the present disclosure, the determination unit is specifically configured to: in a case that the number of the emoji to be added is less than a first number, acquire a second number of default emoji; display, in the preview area, a preview corresponding to the emoji used by the second user and a preview corresponding to the second number of default emoji used by a third user; or in a case that the number of the emojis to be added is greater than the first number and less than or equal to a third number, divide the emojis to be added into a first emoji set and a second emoji set, where the first emoji set includes the fourth number of emoji, and the second emoji set includes an emoji of the emojis to be added except the first emoji set; and display, in the preview area, a preview corresponding to the first emoji set used by the second user and a preview corresponding to the second emoji set used by the third user.

In an embodiment of the present disclosure, the apparatus further includes an adjustment unit and a switch unit.

The adjustment unit is configured to in response to a change in the number of the emoji to be added, adjust the preview area to display a preview corresponding to the emoji to be added in the adjusted preview area.

Alternatively, the display unit 402 is configured to display a switch control in the preview area.

The switch unit is configured to switch the preview displayed in the preview area, in response to a trigger operation on the switch control.

In an embodiment of the present disclosure, the display unit 402 is further configured to display a preview corresponding to a default emoji.

In an embodiment of the present disclosure, the apparatus further includes an update unit.

The acquisition unit 401 is further configured to: acquire an edited emoji, in response to an editing operation on the emoji triggered by the first user.

The update unit is configured to update the preview based on the edited emoji.

It should be noted that, for the specific implementation of each of units in this embodiment, reference may be made to the relevant description in the embodiments of the method described above.

The units in the embodiments of the present disclosure are divided exemplarily, which are divided only based on a logical function. There may be other division methods in practical application. All function units according to the embodiment of the present disclosure may be integrated into one processing unit, or may be a physically separate unit, or may be one unit that is integrated by two or more units. For example, in the above embodiment, a processing unit and a sending unit may be the same unit, or may be different units. The integrated unit may be implemented in a form of hardware, or in a form of a software function unit.

Figure 5:
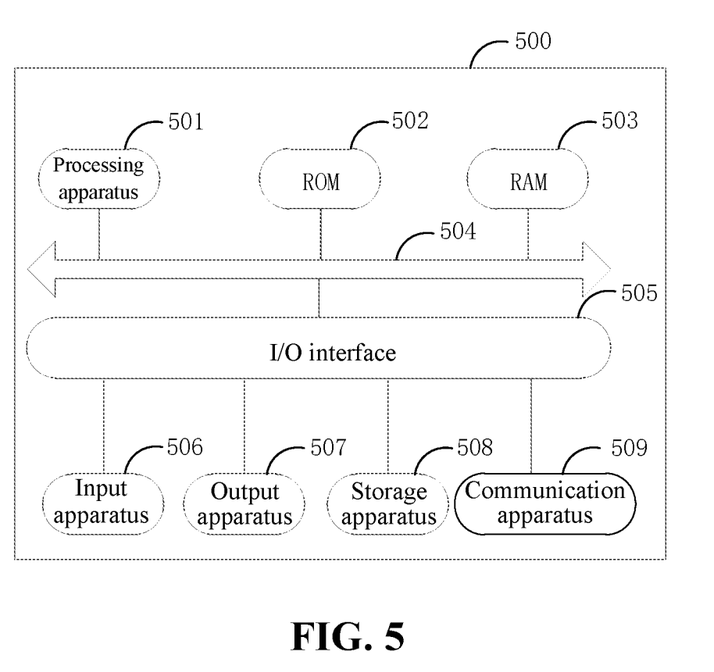
FIG. 5 is a schematic structural diagram showing an electronic device according to an embodiment of the present disclosure.

Referring to FIG. 5, FIG. 5 shows a structural diagram of an electronic device 500 suitable for implementing the embodiments of the present disclosure. The terminal equipment according to the embodiment of the present disclosure may include, but are not limited to, a mobile terminal, such as a mobile phone, a laptop computer, a digital broadcast receiver, a PDA (Personal Digital Assistant), a PAD (Tablet PC), a PMP (Portable Multimedia Player), an in-vehicle terminal (such as an in-vehicle navigation terminal) and the like, and a fixed terminal such as a digital TV, a desktop computer, and the like. The electronic device shown in FIG. 5 is only exemplary, and should not indicate any limitation to the function and scope according to the embodiment of the present disclosure.

As shown in FIG. 5, the electronic device 500 may include a processing apparatus (such as, a Central Processing Unit (CPU) or a graphics processor) 501, which may execute various operations and processing based on a program stored in a Read Only Memory (ROM) 502 or a program loaded from a storage apparatus 508 into a Random Access Memory (RAM) 503. The RAM 503 is further configured to store various programs and data required by the electronic device 500. The processing apparatus 501, the ROM 502 and the RAM 503 are connected to each other via a bus 504. An Input/output (I/O) interface 505 is also connected to the bus 504.

Generally, the I/O interface 505 may be connected to: an input apparatus 506, such as a touch screen, a touch panel, a keyboard, a mouse, a camera, a microphone, an accelerometer, and a gyroscope; an output apparatus 507, such as a liquid crystal display (LCD), a speaker, and a vibrator; a storage apparatus 508 such as a magnetic tape and a hard disk; and a communication apparatus 509. The communication apparatus 509 may enable wireless or wired communication between the electronic device 500 and other devices for data exchanging. Although FIG. 5 shows an electronic device 500 having various apparatuses, it should be understood that the illustrated apparatuses are not necessarily required to all be implemented or included. Alternatively, more or fewer apparatuses may be implemented or included.

Specifically, according to an embodiment of the present disclosure, the process described above in conjunction with flowcharts may be implemented as a computer software program. For example, a computer program product is further provided according to an embodiment of the present disclosure, including a computer program carried on a non-transitory computer readable medium. The computer program includes program code for performing the method shown in the flowchart. In the embodiment, the computer program may be downloaded and installed from the network via the communication apparatus 509, or installed from the storage apparatus 508, or installed from the ROM 502. When the computer program is executed by the processing apparatus 501, the functions defined in the method according to the embodiment of the present disclosure are performed.

The electronic device provided according to the embodiment of the present disclosure and the method provided according to the above embodiment belong to the same concept. For the technical details not described in detail in this embodiment, reference may be made to the embodiments described above. Moreover, this embodiment has the same beneficial effects as the embodiment described above.

A computer storage medium storing a computer program is provided according to an embodiment of the present disclosure. The program, when executed by a processor, performs the method according to the embodiment described above.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a Random Access Memory (RAM), a Read Only Memory (ROM), an Erasable Programmable Read-Only Memory (EPROM or flash memory), an optical fiber, a portable Compact Disc Read-Only Memory (CD-ROM), an optical storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

In some embodiments, a client and a server may communicate with each other using any currently known network protocol such as HTTP (Hyper Text Transfer Protocol) or a future developed network protocol, and may interconnect with digital data communication (for example, a communication network) in any form or medium. Examples of communication network include a Local Area Network ("LAN"), a Wide Area Network ("WAN"), an internet work (for example, an Internet), and a peer-to-peer network (for example, an ad hoc peer-to-peer network), as well as any currently known or future developed network.

The computer readable medium may be incorporated in the electronic device, or may exist alone without being assembled into the electronic device.

The computer readable medium carries one or more programs. The one or more programs, when executed by the electronic device, cause the electronic device to implement the method described above.

The computer program code for performing the operations disclosed in the present disclosure may be written in one or more programming languages or combinations thereof. The programming languages include but not limited to an object-oriented programming language, such as Java, Smalltalk, and C++, and also include a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer through any kind of network including Local Area Network (LAN) or Wide Area Network (WAN) or connected to an external computer (for example, connected through Internet connection by an Internet service provider).

Flowcharts and block diagrams in the drawings illustrate the architecture, functions and operations that can be implemented by the system, method and computer program product according to the embodiment of the present disclosure. Each of blocks in a flowchart or a block diagram may represent a module, a program segment, or a part of code, and part of the module, the program segment, or the code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block diagram and/or flowchart and a combination of the blocks in the block diagram and/or flowchart may be implemented by a dedicated hardware-based system that performs specified functions or operations, or may be realized by a combination of dedicated hardware and computer instructions.

The units mentioned in the description of the embodiment of the present disclosure may be implemented by means of software, or otherwise by means of hardware. In some circumstances, name of a unit/module does not constitute a limitation on the unit itself.

The functions described herein above may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program to be used by or in connection with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a Random Access Memory (RAM), a Read Only Memory (ROM), an Erasable Programmable Read-Only Memory (EPROM or flash memory), an optical fiber, a portable Compact Disc Read-Only Memory (CD-ROM), an optical storage device, a magnetic storage device or any suitable combination thereof.

It should be noted that embodiments in this specification are described in a progressive manner. Each embodiment focuses on differences from other embodiments, and reference may be made among these embodiments with respect to the same or similar parts. Since the system or the apparatus disclosed in the embodiments corresponds to the method disclosed in the embodiment, the description for the system or the apparatus is simple, and reference may be made to the embodiment of the method for the relevant parts.

It should be understood that in the present disclosure, the term "at least one" refers to a quantity equal to one or more, and the term "multiple" refers to a quantity equal to two or more. The term "and/or" are used to describe an association relationship between objects, and indicates three possible relationships. For example, "A and/or B" may indicate a case that there is only A, a case that there is only B, and a case that there are both A and B. In each case, a quantity of A may be one or more, and a quantity of B may be one or more. The symbol "/" generally indicates that a former object and a latter object are associated by an "or" relationship. The term "at least one of" or a similar expression refers to "any combination of", including any combination consisting of a single item or multiple items. For example, at least one of a, b, or c may indicate: a, b, c, "a and b", "a and c", "b and c", or "a, b, and c", where a, b, and c may be singular or plural.

It should be further noted that the relationship terminologies such as first, second or the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, a process, method, article or device limited by "comprising/including a(n) . . . " does not exclude existence of another identical element in the process, method, article or device.

The steps of the method or algorithm described in conjunction with the embodiments of the present disclosure may be implemented by hardware, software modules executed by a processor, or a combination thereof. The software module may be stored in a Random Access Memory (RAM), a memory, a Read-Only Memory (ROM), an electrical programmable ROM, an electrically erasable programmable ROM, a register, a hardware disk, a removable magnetic disk, a CD-ROM, or any other forms of storage medium well known in the art.

Those skilled in the art may implement or practice the present disclosure based on the above descriptions of the disclosed embodiments. Various modifications to the embodiments are obvious to the person skilled in the art, and general principles defined in the present disclosure may be implemented in other embodiments without departing from the spirit or scope of the present disclosure. Therefore, the present disclosure shall not be limited to the embodiments described herein but have the widest scope that complies with the principle and novelty disclosed in this specification.

The invention claimed is:

1. An emoji preview method, comprising:
acquiring an emoji to be added, in response to an adding operation triggered by a first user on a first page, wherein the emoji to be added is associated with a live stream of the first user, and is to be used by a second user who is related to the live stream corresponding to the first user; and displaying a preview, wherein the preview corresponds to the emoji to be added, and the preview is an effect image of the emoji which is sent by the second user.

2. The emoji preview method according to claim 1, wherein displaying the preview comprises:
    displaying the preview in a preview area of the first page.

3. The emoji preview method according to claim 1, wherein the preview comprises a first preview corresponding to the emoji to be added in a message sent by the second user, and/or a second preview corresponding to the emoji to be added being displayed on a second page, wherein the second page is provided with an access to acquire a right to use the emoji to be added; and the second user acquires the right to use the emoji to be added, through the access.

4. The emoji preview method according to claim 3, wherein the first preview is a preview corresponding to the emoji to be added in the message published by the second user on a public screen of the live stream.

5. The emoji preview method according to claim 4, wherein the first preview comprises an identifier of the second user, an emoji sent by the second user and a comment box.

6. The emoji preview method according to claim 4, wherein size information on the emoji to be added, displayed in the first preview, is consistent with size information on the emoji to be added, displayed on the public screen.

7. The emoji preview method according to claim 1, further comprising:
    determining the emoji to be added as an emoji for the live stream of the first user, in response to a submission request for the emoji to be added, wherein the second user performs comment and interaction in the live stream by using the emoji to be added.

8. The emoji preview method according to claim 4, further comprising:
    determining a preview rule based on the number of emoji to be added; and
    determining the first preview based on the preview rule.

9. The emoji preview method according to claim 8, wherein determining the first preview based on the preview rule comprises:
    in a case that the number of emoji to be added is less than a first number, acquiring a second number of default emoji; displaying, in the preview area, a preview corresponding to the second user using the emoji to be used and a preview corresponding to a third user using the second number of default emoji; or
    in a case that the number of emojis to be added is greater than the first number and less than or equal to a third number, dividing the emojis to be added into a first emoji set and a second emoji set, wherein the first emoji set comprises a fourth number of emoji, and the second emoji set comprises an emoji of the emojis to be added except the first emoji set; and displaying, in the preview area, a preview corresponding to the second user using the first emoji set and a preview corresponding to the third user using the second emoji set.

10. The emoji preview method according to claim 2, wherein the preview comprises a first preview corresponding to the emoji to be added in a message sent by the second user, and/or a second preview corresponding to the emoji to be added being displayed on a second page, wherein the second user has a preset association relationship with the live stream corresponding to the first user, the second page is provided with an access to acquire an right to use the emoji to be added; and the second user acquires the right to use the emoji to be added, through the access.

11. The emoji preview method according to claim 2, further comprising:
    adjusting the preview area in response to a change in the number of the emoji to be added, to display the preview corresponding to the emoji to be added in the adjusted preview area; or
    displaying a switch control in the preview area, and switching the preview displayed in the preview area in response to a trigger operation on the switch control.

12. The emoji preview method according to claim 1, wherein before the first user triggers the adding operation, the method further comprises:
    displaying a preview corresponding to a default emoji.

13. The emoji preview method according to claim 1, further comprising:
    acquiring an edited emoji, in response to an editing operation on the emoji triggered by the first user; and
    updating the preview based on the edited emoji.

14. An electronic device, comprising a processor and a memory, wherein,
    the memory is configured to store instructions or computer programs; and
    the processor is configured to execute the instructions or the computer programs in the memory, to cause the electronic device to
    acquire an emoji to be added, in response to an adding operation triggered by a first user on a first page, wherein the emoji to be added is associated with a live stream of the first user and is to be used by a second user who is related to the live stream corresponding to the first user; and
    display a preview, wherein the preview corresponds to the emoji to be added, and the preview is an effect image of the emoji which is sent by the second user.

15. The electronic device according to claim 14, wherein the processor is configured to execute the instructions or the computer programs in the memory, to cause the electronic device to:
    display the preview in a preview area of the first page.

16. The electronic device according to claim 14, wherein the preview comprises a first preview corresponding to the emoji to be added in a message sent by the second user, and/or a second preview corresponding to the emoji to be added being displayed on a second page, wherein the second page is provided with an access to acquire a right to use the emoji to be added; and the second user acquires the right to use the emoji to be added, through the access.

17. The electronic device according to claim 14, wherein the processor is configured to execute the instructions or the computer programs in the memory, to cause the electronic device to:
    determine the emoji to be added as an emoji for the live stream of the first user, in response to a submission request for the emoji to be added, wherein the second user performs comment and interaction in the live stream by using the emoji to be added.

18. A non-transitory computer readable storage medium storing instructions, wherein the instructions, when executed on a device, cause the device to
    acquire an emoji to be added, in response to an adding operation triggered by a first user on a first page, wherein the emoji to be added is associated with a live stream of the first user and is to be used by a second user who is related to the live stream corresponding to the first user; and display a preview, wherein the preview corresponds to the emoji to be added, and the preview is an effect image of the emoji which is sent by the second user.

* * * * *